United States Patent [19]

Goodman

[11] 4,306,248
[45] Dec. 15, 1981

[54] FULL-RESOLUTION BEAM-INDEX MULTI-COLOR DISPLAYS

[76] Inventor: David M. Goodman, 952 Santa Queta, Solana Beach, Calif. 92075

[21] Appl. No.: 170,727

[22] Filed: Jul. 21, 1980

Related U.S. Application Data

[63] Continuation-in-part of Ser. No. 961,280, Nov. 16, 1978, Pat. No. 4,225,880.

[51] Int. Cl.³ .......................... H04N 9/16; H04N 9/31
[52] U.S. Cl. ...................................... 358/56; 358/60; 358/66; 358/67
[58] Field of Search .................... 358/51, 56, 64, 66, 358/67, 60

[56] References Cited

U.S. PATENT DOCUMENTS

3,943,279  3/1976  Austefjord ........................ 358/60 X
3,967,315  6/1976  Goodman ............................ 358/60

Primary Examiner—Robert L. Richardson
Attorney, Agent, or Firm—O'Brien & Marks

[57] ABSTRACT

Programmable power supplies are made responsive to beam-index and timing signals in order to automatically control the size and position of the display on a cathode ray tube. The high voltage power supply is also made programmable, responsive to video signal content, to reduce the energy stored in the high voltage circuits. Savings in energy consumption are also obtained by efficiently modulating the target screen of a beam-index type color cathode ray tube. Energy lost at the target screen is less than 10% compared to approximately 70% for a conventional color tube, an improvement factor of 7:1 or more. Taking advantage of the above features, a multi-color display apparatus is disclosed which employs dual excitation of a planar target screen to provide high resolution information in monochrome together with a wide range of colors for enhancement of contrast and for improved information discrimination. Beam-indexing means are used to maintain the registration between the monochrome and color components of the information being displayed.

30 Claims, 23 Drawing Figures

FULL-RESOLUTION BEAM-INDEX MULTI-COLOR DISPLAYS

CROSS REFERENCE TO RELATED APPLICATIONS

This application is a continuation-in-part of Ser. No. 961,280 filed Nov. 16, 1978 now U.S. Pat. No. 4,225,880 entitled "Energy-Efficient Beam-Index Displays With Programmable Power Supplies" which is incorporated herein by reference.

BACKGROUND OF THE INVENTION

It is known to use electron beams and light beams to excite a target screen as one step in developing a viewable picture, either monochrome or color. For color rendition, by far the most popular form of display device is the so-called "shadow-mask" cathode ray tube. It is also known, however, that there is another more efficient way to control the generation of a color picture; by synchronizing the excitation of the target screen via index signals which provide information as to the location of the electron beam or light beam as set forth for example in U.S. Pat. No. 3,967,315.

Another category of display devices exists which develops high resolution viewable images in color, the so-called penetration cathode ray tube. The voltage at the target screen in these penetration tubes is switched over the range from 6-18 kilovolts to change the color of the image being generated.

Also, very high resolution kinescopes in monochrome are used to present alpha-numeric or graphic type data. The performance of these kinescopes is reaching the stage where the quality of the image developed approaches that of the printed page with four point type.

In all the above types of display devices there are problems having to do with the power supplies required for their operation. For example, to operate the "shadow-mask" tube a high voltage supply typically furnishes 25-30 kilovolts with an average current of approximately 1 milliampere. Two serious problems are associated with power supplies capable of providing such power. First, there is the matter of health and safety for the operator or the maintenance technician. The voltages and power involved are lethal. Second, there is the matter of display system malfunction which can be brought about by high voltage arcing between elements of the kinescope. Various forms of arc suppression are in use but each has its limitations. Furthermore, some sensitive circuits can be destroyed even when high voltage arcs are shunted to ground to protect the tube.

In the penetration type kinescope, it is possible to achieve very high resolution in any single color because of the homogenous construction of the different color producing phosphor layers. However, to achieve correct registration of the image from one color to the next presents a serious problem because the deflection sensitivity of the display system has to track large changes in high voltage to a very high degree of precision.

In the high resolution monochrome kinescope a similar registration problem arises because as the resolution gets better and better the requirement to control the exact position of the electron beam continues to increase.

In the beam-index color tube, the problem is the least severe but the stability and energy storage of the power supplies still are matters of concern.

For the above reasons, the cost and energy utilization of power supplies in modern high resolution and color display devices are becoming leading factors in the overall performance and selling price of the complete display system.

Additionally, in terms of energy-efficiency, the penetration type color tube suffers from the usual practice of 'killing' one of the phosphors in order that it not respond to low levels of excitation. Nevertheless, despite this practice (which results in lower screen brightness) and the requirement for fast switching of the high voltage, and the limited range of colors that are provided, the penetration tube is often selected today as the display medium because it yields high resolution in the vector (stroke) writing mode.

SUMMARY OF THE INVENTION

The display systems described herein make use of programmable power supplies which are automatically adjusted, in response to beam-index signals, to control picture size and position. The high voltage power supply also is programmed to reduce its capacity to deliver energy. The invention is described for NTSC television (525 line raster scan) beam-index displays, either direct view or projection; electron beam or light beam scanned. It is clearly applicable to the other display systems when the beam-indexing features are added thereto.

The control of picture size is achieved by measuring the time it takes for the scanning beam to traverse the target screen, comparing this measured time with a reference time, and then adjusting the deflection power to bring the measured time into agreement with the reference time. The measurement is started by a first index signal and is stopped by a second index signal. These two index signals are derived from the target screen in a novel application of the classic beam-index principle.

The control of picture position on the target screen is achieved by measuring the time interval between the deflection synchronizing (or flyback) pulses and first index signals, and then adjusting this time interval to a known value by shifting the picture left or right, or up or down.

The reduction of stored energy is made possible by controlling the magnitude of the high voltage as a function of the video drive integrated over a television field or frame.

Two other important features are disclosed which have to do with increasing the efficiency of energy utilization at the target screen. Thus, means are described which increase the luminance component in an NTSC type signal when a pure blue field is being received to insure that adequate beam current will be available in the CRT for indexing purposes. This decreases slightly the saturation of the blue field, which is deemed acceptable. Also with respect to the blue field, the target screen is made to have the blue-emitting phosphor strips more narrow than the other color-emitting strips to reduce the apparent (subjective) vertical line structure of the viewed image.

Additional inventive features are set forth which still further reduce the subjective visibility of the line structure (or other discrete pattern) of the display screen. It is shown in this connection how the advantages of high-speed raster scan and high-resolution vector writing can both be obtained simultaneously by exciting a novel target screen in a manner to be described in two modes, with two different types of excitation. One form of scanning energy or excitation is used to develop a high brightness, full resolution image in the green (or white) region of the spectrum. A second form of scanning energy or excitation is used to develop a high brightness, color image in a different part of the spectrum, e.g., red and/or blue. Either vector (stroke) writing or raster scanning can be used to develop the high resolution image but the former is preferred. Raster scanning is preferred for the color image. Both the high resolution and the color images are developed in the same viewing plane which is comprised of a target screen having uniform or homogenous properties insofar as the high resolution image is concerned but having either a homogenous structure or a line screen pattern insofar as the color image is concerned. The different images are then kept in register on the target screen by controlling each image independently with respect to size and position.

DESCRIPTION OF THE PREFERRED EMBODIMENT

Figures 1, 2:
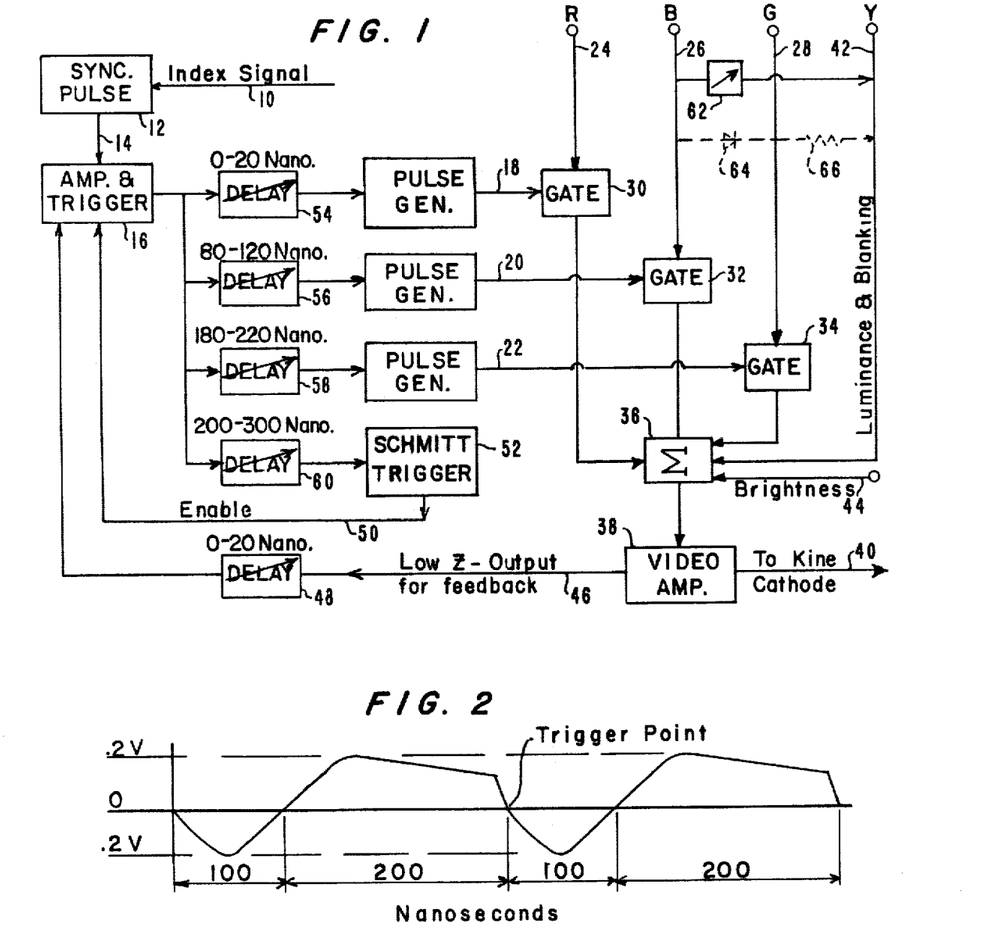
FIG. 1 is a block diagram of color video sampling and timing circuits, responsive to index signals, which modulate the scanning electron beam in a raster-scan beam-index type of cathode ray tube display.
FIG. 2 is a timing diagram (for a 5 inch diagonal picture tube) which depicts an input index signal from which a master synchronizing pulse is derived.
Figure 3:
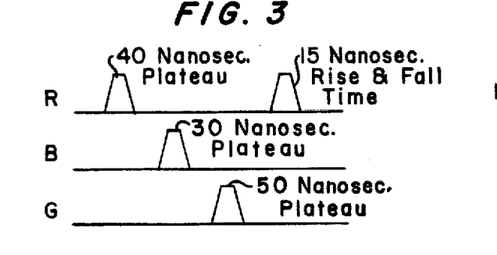
FIG. 3 is a timing diagram which depicts the preferred sequence of the sampling pulses which generate to red, blue, and green modulating pulses.

The invention is described with reference to a beam-index color CRT display system because this type of display is more energy efficient than either the shadow-mask or penetration kinescope; and because some of the desired index signal features already form an integral part of the beam-index device. Accordingly, background information on a typical raster-scan beam-index display responsive to NTSC signals is illustrated in FIG. 1. Primary input index signal 10 is fed into sync pulse generator 12 to start events. Index signal 10 can be electrical or optical. Means for generating this index signal are described in U.S. Pat. Nos. 3,564,121 and 3,826,867 by way of example. A secondary index signal that has been successfully as a synchronizing pulse for NTSC color signals is depicted in FIG. 2. The negative-going zero-crossing of that index signal is used as a trigger point from which a master sync pulse 14 is derived. From amplifier/trigger 16 three sampling pulses 18, 20, 22 having waveshapes approximately as shown in FIG. 3 are derived and are used to sample the red, blue, and green video signals 24, 26, 28 via gate means 30, 32, 34. The outputs from gates 30, 32, 34 are summed in junction 36 and then through video amplifier 38 are transmitted to modulate the scanning electron beam. It is preferred (but not essential) that the scanning electron beam be modulated via the cathode element in the kinescope as shown at 40 in FIG. 1, and at 240 in FIG. 5.

Also shown feeding into summing junction 36 is the incoming luminance signal 42 containing vertical and horizontal blanking signals, and the brightness control signal 44. Two outputs from video amplifier 38 are shown. One output 40 is for modulating the kinescope as stated. The other output 46 is fed back, via suitable delay 48, to help stabilize the trigger point of amplifier/trigger 16. A second feedback signal 50 enables amplifier/trigger 16 so that it can only be triggered during a selected time interval, set by Schmitt Trigger or multivibrator 52. Delay elements 48, 54, 56, 58, and 60 are shown as adjustable but can be fixed (or selectable for different raster scanning rates) for any given design. Satisfactory pictures have been obtained on a 5 inch diagonal direct view CRT with R, B, and G signals and also with color difference signals R-Y, B-Y, and G-Y at inputs 24, 26, 28. Several improvements in the foregoing arrangement are possible which are now described.

Figures 5, 6:
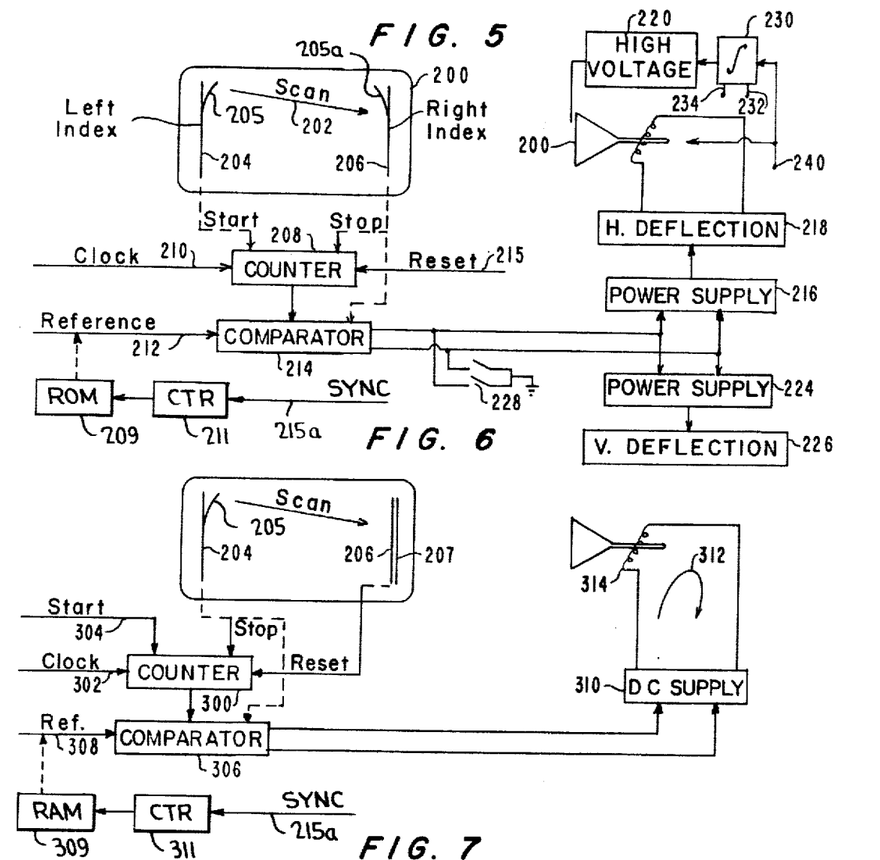
FIG. 5 is a block diagram which illustrates how the width of the picture is changed by controlling the duration of the horizontal scan from a first index strip to a second index strip.
FIG. 6 is a block diagram which illustrates how the horizontal position of the picture is changed by controlling the duration of the horizontal scan from a selected portion of the retrace cycle to a first index strip.

In FIG. 5, the width and the height of the pictures developed on target screen 200 are automatically controlled. The electron beam traverses the target screen in a conventional raster scan 202. Near the left margin of the target screen is index strip 204. Near the right margin is index strip 206. When the scanning beam strikes strip 204 an index pulse is generated and detected which starts counter 208. When the beam strikes strip 206 an index pulse stops counter 208. During this interval, the counter 208 counts clock pulses which arrive continuously at 210. By way of example, clock input 210 is set at 20 megaHertz, derived from a crystal oscillator not shown. If the effective horizontal raster scanning interval is rounded off to 50 microseconds, then 1000 clock pulses are received between the start and stop pulses when the horizontal scan is set properly. Accordingly, the reference input count 212 is set at 1000. When the stop pulse is received from 206 it also enables comparator 214. If the count is exactly 1000, there is no change in the output from comparator 214. Hence, power supply 216 continues to supply the same drive to horizontal deflection means 218. But, if the horizontal sweep is slow and it takes an extra microsecond for the beam to travel from 204 to 206 then it follows that 20 additional clock pulses will be counted. When comparator 214 is enabled the count will be high by 20 additional clock pulses. This results in a signal to power supply 216 to increase the drive to horizontal deflection means 218. This speeds up the sweep, as is desired. Conversely, if the sweep is too fast not enough clock pulses will be counted and the comparator 214 will indicate a low count. This results in a signal to power supply 216 to decrease the horizontal sweep speed. Counter 208 is reset at 215 by a signal derived from the horizontal flyback pulse. Power supply 216 can be made to respond to a single count, high or low, and so the sweep width can be controlled to one part in one thousand which is more than adequate to meet the requirements for home entertainment viewing of a television receiver, and which is adequate for many precision industrial applications.

Automatic vertical size control is achieved by having the output of power supply 224 respond to the same control as power supply 216. This arrangement is based upon the assumption that whatever change is needed in horizontal deflection power is also needed in vertical deflection power. This assumption is predicated on the fact that the target screen voltage governs deflection sensitivity, and that it equally effects vertical and horizontal deflection. Hence, power supply 224 controls the magnitude of the vertical deflection, provided by 226, and is responsive to the same signals that cause the output of power supply 216 to change.

Manually operated switches 228 are used for initial set-up. The switches are closed to interrupt the output of comparator 214. The deflection yoke is positioned, all voltages set at nominal, and the system is aligned. Switches 228 are then opened to enable the automatic size correction features to become operative.

As just stated, the size of the picture is controlled by the high voltage applied to the target screen 200 and by the magnitude of the currents in the deflection yoke. For this reason, absent this invention, when it is desired to keep the picture size constant the practice has been to regulate the high voltage to keep it between upper and lower limits. While this practice is effective, it also means that contact by a person with the high voltage will induce a shock which will be greater than if the supply were not regulated. This is a most undesirable safety hazard which prompts much caution and warning to the customer. It is also well known that spontaneous high voltage arcs will occur between elements of the kinescope that can do much damage. It has been reported that the short circuit current carried by these arcs can be as high as 400 amperes in a typical television receiver operating at 40 kilovolts. Spark gaps are in common use to protect the kinescope, and the circuits in the vicinity thereof, but they are not always effective. As a consequence other forms of limiting these surge currents have also been used.

In this invention, because the picture size is automatically held constant by controlling the deflection power, it becomes practical to permit the high voltage to fluctuate over wider limits than heretofore. Accordingly, the high voltage power supplies can have higher impedances and less energy storage than is customary; thereby reducing the danger to personnel, reducing the damage that may be caused by arcs, and reducing the cost of the supply itself. Thus, in FIG. 5, high voltage power supply 220 is used to energize target screen 200. The high voltage of supply 220 can be derived from the horizontal flyback pulse, as is customary in entertainment type television receivers, or can be provided from a self-contained unit as is customary to meet the requirements of color beam penetration tubes. In any case, in accordance with this invention the impedance of the high voltage power supply is increased to the extent that a full picture (or a display packed densely with alpha-numerics) draws large enough currents to cause the target screen to measureably drop in voltage. The impedance can be increased by using a voltage multiplier with capacitors of smaller size than is customary. Also, the capacitance from the anode button to ground on the CRT, typically 1900 pF for a 19 inch tube, can be reduced. To prevent loss of brightness or color shift, a feed-forward feature is incorporated at 230 and 240 of FIG. 5 to compensate for the drop in voltage. The cathode drive signal, derived at 40 in FIG. 1, is fed to the kinescope to modulate the electron beam. It is also fed to integrator 230 where it is integrated on a field to field or frame to frame basis, or for several frames. When the integrated value of the cathode drive increases above a reference value a signal is developed which programs an increase in the output of 220, thereby to compensate for the voltage drop brought about by the increased current at target screen 200. Conversely, when the integrated value shows a decrease at the end of a given integration time then a signal is developed which programs a reduction in the high voltage output. Integrator 230 can be analog or digital. Analog integration is preferred when scenic pictures are displayed. Digital integration is preferred when alpha-numerics are displayed. Typically, the integration starts with the trailing edge of a vertical flyback pulse at 232 when a new field or frame starts and ends with the leading edge of the vertical flyback pulse at 234 when the field or frame is completed. Shifts in the high voltage will coincide with a changing scene, or changing text, and therefore will occur at a time when these changes can be most easily accomodated by the viewer.

In FIG. 6, an arrangement is shown for controlling the left margin of the display. The principle of operation is similar to that of FIG. 5. Counter 300 is incremented by clock pulses 302. The count is started at the end of the retrace (flyback) pulse at 304 or by a selected portion of the horizontal sync signal. The count is stopped by the pulse from index strip 204. The stop pulse also enables comparator 306. A reference count 308 is used to set the left margin. A reset pulse is derived from index strip 206, or other strips subsequent to 204. If the reading from counter 300 is higher than the reference count set at 308 then too many clock pulses have been received. The left margin is too wide. To correct this situation, direct current supply 310 is programmed to pass current 312 through deflection yoke 314 to shift the picture to the right. Conversely, if the reading from counter 300 is too low when comparator 306 is enabled, then the putput current 312 of power supply 310 is reversed to shift the picture to the left.

DUAL EXCITATION OF TARGET SCREEN

FIGS. 8-21 are best described by making reference to additional background information starting with Lustig et al U.S. Pat. No. 3,946,267 at Column 1:

Cathode ray display tubes satisfactory for application in information displays such as air traffic control, radar data processing, and the like systems have unusual requirements generally not met by cathode ray tubes of the type conventionally available for color television viewing. In particular, they often do not require the many colors needed for a television screen; for example, the provision of blue may even be undesirable. While red and green are readily simultaneously focused by the optics of the normal eye at the sensitive high resolution fovea, the blue component of the image is normally out of focus and its presence may even tire the eye. Further, the very center of the fovea is red and green sensitive, but blue is not appreciably sensed there. Since red and green light may purposely be mixed so as to yield the sensations of orange or of yellow in the eye, a wide range of colors adequate for information displays is available without the use of blue.

In Land U.S. Pat. No. 3,523,159 two kinescopes are used to generate three images which are combined with a single dichroic mirror. One kinescope is monochrome, the other is binary and operates on the penetration principle. The monochrome image is red. The binary image is either pale blue or green. Quoting from Column 5, beginning at line 32:

The green, blue and red image components are viewed in registration by the viewer as a full color representation of the televised scene. With this arrangement, it will be noted that the green and pale blue image components are produced only on alternate scannings of the viewing field, whereas a red image component is produced on each scanning of the viewing field. Accordingly, green and pale blue image components are each produced only half the time the red image component is being produced. Thus, the brightness of the red image component relative to the blue and green image components is enhanced. This feature is an important advantage of the system of the present invention since the brightness of the red image component is a limiting factor in the overall picture brightness in most color television receivers. This advantage, however, does not explain the striking color quality that is achieved by the system of the present invention. This color quality is achieved as a result of the particular chromatic content of each of the image components which comprise the composite image perceived by the viewer.

The key to the exceptional color quality achieved by the system of the present invention is the fact that the image component produced in accordance with the blue video consists of light generated by excitation of both green and blue phosphors, whereas the image component produced in accordance with the red video signal consists of light produced by the excitation of red phosphor and the image component produced in accordance with the green video signal consists of light generated by the excitation of only green phosphor.

The principles of the present invention relating to the exceptional color quality achieved as a result of the particular chromatic contents of the image components of the composite color image perceived by the viewer is not limited to the particular system of the preferred embodiment of the invention described above as other systems can be designed to produce image components with these chromatic contents. Also, the aspects of the present inventon relating to the improvement of color quality in penetration type color television picture tubes by producing an image component with a monochromatic kinescope to be superimposed on image components produced by a penetration type kinescope is also not limited to systems producing image components having the particular chromatic contents described above. For example, improved color quality over prior art systems can be achieved if the monochromatic kinescope produces a blue image component in accordance with the blue video signal. In such an arrangement, the layers of phosphor on the screen of the binary kinescope would be selected to emit red and green light upon being excited by an impinging electron. The red layer would be excited in accordance with the red video signal to produce a red image component and both the red and green layers would be excited in accordance with the green video signal to produce a white or yellow image component in accordance with the green video signal.

In Takeuchi et al U.S. Pat. No. 4,051,513 three kinescopes are used for a color TV projection apparatus wherein a single dichroic mirror is used to combine the red and blue kinescope images. The green image is projected off-axis onto the viewing screen. The main advantages of this configuration are delineated in the patent with respect to prior art three lens-three kinescope systems and prior art one lens systems using two crossed dichroic mirrors. The invention also improves upon the registration problem as set forth at Column 1 as follows:

Furthermore, in the prior art color projector, due to the fact that the optical paths from the respective cathode ray tubes to the screen are different and their projecting angles on the screen also are different, keystone distortion must be corrected to obtain registration over the screen. In addition, when the size of a picture on the screen is changed, it is necessary to correct the keystone distortion, the position of the picture, the focal position of the projecting lens apparatus, the optical axes thereof and the optical axes of the cathode ray tubes, which is troublesome and requires complicated optical apparatus, electrical circuitry and difficult adjustments. Moreover, the prior art color projector requires a three lens system, which is expensive.

It is also known in the art to use a pair of crossed dichroic mirrors disposed in front of three cathode ray tubes for synthesizing a three color image therefrom and projecting the synthesized image on a screen through a single lens. In this case, the light axes of three cathode ray tubes coincide with each other; however, owing to light loss through and on the dichroic mirrors, the color image projected on the screen cannot have sufficient brightness.

Furthermore, since the viewing angles of the cathode ray tubes to the dichroic mirrors are rather large, the permeable or reflection characteristics of the dichroic mirrors are much different at the centers and at the ends of the dichroic mirrors and accordingly considerable color shading appears.

The problem of registration of CRT images is not new. In Clapp U.S. Pat. No. 2,476,698 means are disclosed for limearizing the scanning raster on a CRT. In Bond et al U.S. Pat. No. 2,634,325 means are disclosed for controlling raster excitation. Note also Kagan U.S. Pat. No. 3,284,662 and Merryman U.S. Pat. No. 3,372,298 and Land U.S. Pat. No. 3,492,412. A recent approach to the problem is set forth in Strathman U.S. Pat. No. 4,159,484. Further useful background information is contained in Leverenz U.S. Pat. No. 2,774,003 and Austefjord U.S. Pat. No. 3,943,279 and Toone U.S. Pat. No. 3,996,611.

On the matter of objectionable line structure and annoying flicker see Goode U.S. Pat. No. 3,541,236. On the merging or superimposing of photographic images and electronic images see Gruen U.S. Pat. No. 3,384,712. On the generation of a full color image by scanning three optical beams across a target screen with a homogeneous coating of three phosphors see Haeff U.S. Pat. No. 3,303,276 at column 12. And for the early use of a luminescent picture screen see Wright U.S. Pat. No. 1,166,569.

By carefully identifying the problems alluded to in different parts of many of the foregoing disclosures and by building upon the teachings in parent application Ser. No. 961,280 referred to at the outset of this specification, the arrangement of FIG. 8 was conceived and will now be described.

Figure 8:
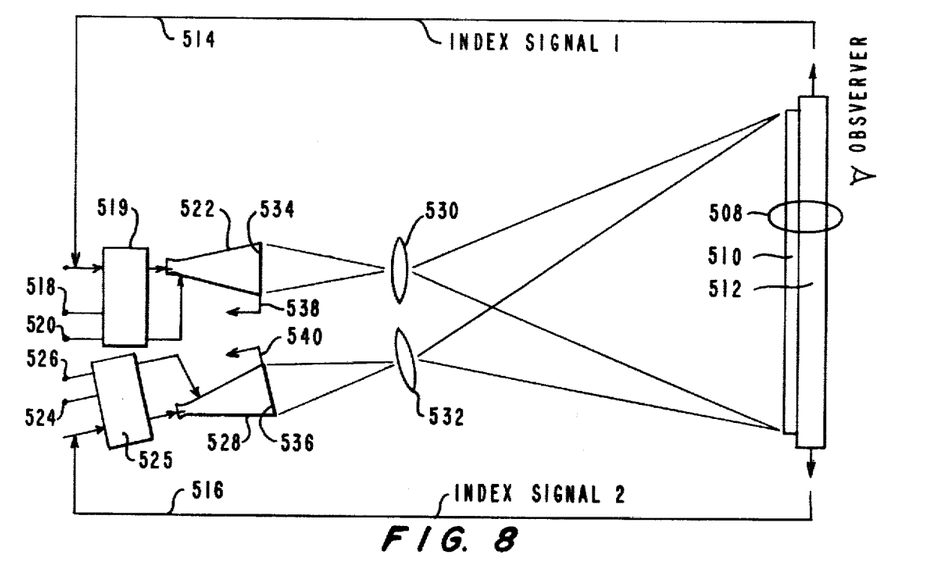
FIG. 8 depicts a first CRT for generating a first image and a second CRT for generating a second image. Both images are shown being projected upon the same viewing screen with two different index signals, one for each CRT.

Target screen 508 comprises thin translucent screen 510 mounted on transparent substrate 512 and includes index means for providing a first index signal 514 and a second index signal 516. Data and deflection signals representative of the green signal to be displayed are received at 518 and 520, respectively, to modulate and scan the electron beam of first kinescope 522. The green signal received at 518 is intended to carry the high resolution and the high brightness portions of the information to be displayed on target screen 508. Data and deflection signals representative of the color signals to be displayed are received at 524 and 526, respectively, to modulate and scan the electron beam of second kinescope 528. The high resolution image is projected via lens 530, the color image is projected via lens 532. CRT 522 and projection optics 530 are on-axis and are optimized to transmit radiation in the green part of the spectrum. CRT 528 and projection optics 532 are shown off-axis and are optimized to transmit radiation in the ultraviolet part of the spectrum. The green image is generated by conventional P-22G phosphors inside CRT 522 as depicted at 534. The color image, or images, are generated by ultraviolet excitation of target screen 508. The ultraviolet is derived from conventional P-16 phosphor inside CRT 528 depicted at 536.

Figure 9:
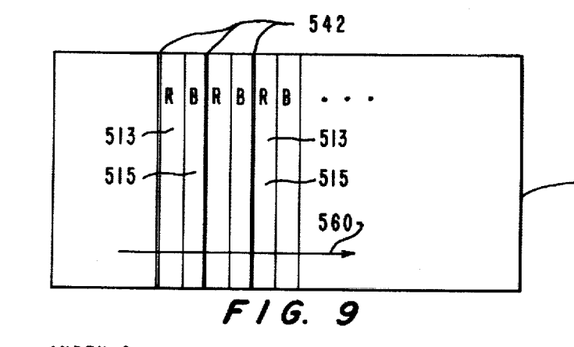
FIG. 9 depicts a front view of the viewing screen of FIG. 8.
Figure 10:
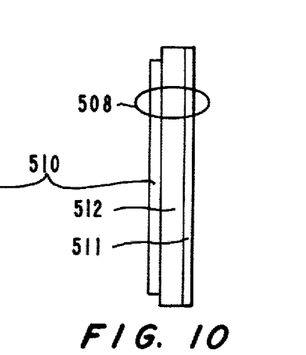
FIG. 10 depicts a side view of the screen of FIG. 9.

In FIGS. 9 and 10 the image developing surface 510 of target screen 508 is illustrated for a three-color system. Red-emitting strips 513 are comprised of conventional ultraviolet sensitive P-22R phosphors. Blue-emitting strips 515 are comprised of conventional ultraviolet sensitive P-22B phosphors. Strips 513 and 515 are thin, vertically oriented, adjacently positioned, and alternated across the screen. The phosphors P-22B and P-22R are white in color when not excited. They are small in size preferably less than 5 microns. These phosphers 513 and 515 are deposited on glass substrate 512 to a depth of about 15 microns or less so that viewing can take place on the far side of substrate 512. An ultraviolet-blocking contrast enhancement filter 511 is also shown. Index strips 542 will be described below.

When a high resolution image in green light is projected and focused upon surface 510, as in FIG. 8, a high resolution image is viewable through the substrate 510 and filter 511 of the target screen 508. The image plane appears smooth and homogeneous to the green light because the strips 513 and 515 are of small general particle size, deposited adjacent to each other, and with about the same thickness of deposit. It follows that other strips can be interspersed with 513 and 515, and the use of index strips 542 will be described in connection with FIGS. 11-17. But it is to be noted at this point that in a two-color red-green system the surface 510 can be comprised of a uniform layer of P-22R phosphor.

Figure 11:
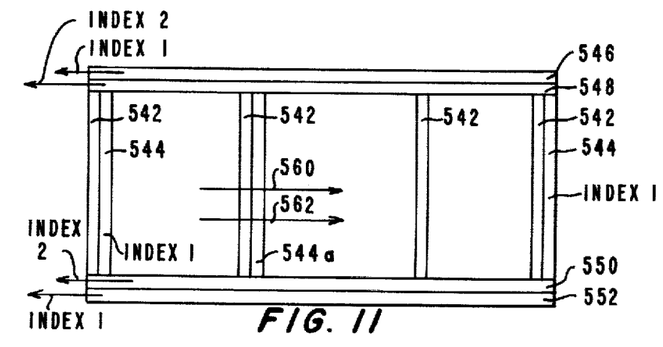
FIG. 11 illustrates a pair of horizontal index strips at the top and bottom of the viewing screen, several pairs of vertical index strips, and individual vertical index strips useable with the target screen of FIG. 8.
Figure 12:
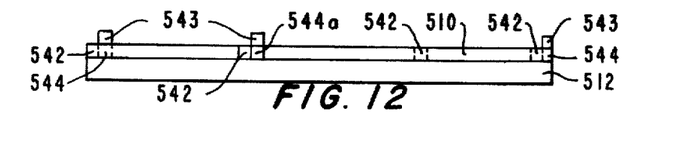
FIG. 12 is a side view of the screen of FIG. 11.
Figure 13:
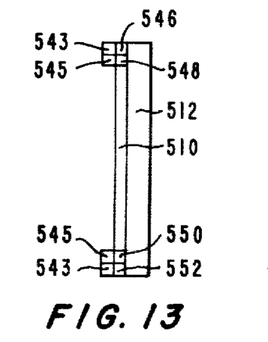
FIG. 13 is another view of the screen of FIG. 11.
Figure 14:
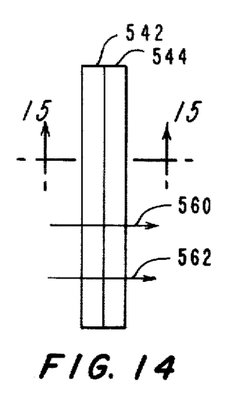
FIG. 14 illustrates one physical configuration of a pair of round index strips.

It has been taught since the early days of beam-index technology to derive different index signals from different parts of a target screen in an attempt to simultaneously control several scanning beams. A variant of this approach is illustrated in the target screen of FIGS. 11-13 which represents one embodiment of target screen 508 of FIGS. 8 and 9. Thus, index strips 542 and 544 are shown in FIGS. 11-13, greatly magnified for ease of description. These strips correspond in purpose to strips 150, 204, 206, and 207 of FIGS. 4, 5, and 6. Also shown are horizontal strips 548 and 550 which correspond in purpose to strips 400, 402, 404 and 406, 408, 410 respectively of FIG. 7.

The system operation of the display of FIG. 8 is now described, with both kinescopes 522 and 528 being driven in an NTSC raster scan mode. The high resolution green video signal at 518 (or high resolution luminance signal) and the properly synchronized deflection signals at 520 cause an image to be developed on the P-22G phosphor 534 of CRT 522 in conventional manner. The image is projected upon target screen 508 via conventional reflective, refractive, or Schmidt optics 530. The red and blue video signals 524 and properly synchronized deflection signals 526 cause an ultraviolet image to be developed on the P-16 phosphor 536 of CRT 528 in accordance with the teachings of Goodman U.S. Pat. No. 3,967,315 which is hereby incorporated by reference. This ultraviolet image is converted into a visible red and blue image at the screen surface 510 where the strips 513 shown in FIG. 9 emit red radiation and the strips 515 emit blue radiation in response to excitation by the ultraviolet scanning beam projected from CRT 528 via optics 532. The red and blue components of the images are in proper register but the image as a whole may be left or right, or up or down from its preferred position.

Thus, there are three images which have to be put into registration on the target screen 508. Index strips 542, 544, 546, 548, 550 and 552 in FIGS. 11-13 are used for this purpose. As noted the red and blue images are put on screen 510 in accordance with the teachings in Goodman U.S. Pat. No. 3,967,315. Index signal 2 is used for this purpose and is derived from light pipe 542 which is excited when impacted by ultraviolet scanning beam 560. Light pipe 542 comprises a thin rod of plastic scintillator such as NE-102 available from Nuclear Enterprises in San Carlos, Calif. (also a supplier of NE-103 and NE-108) and responds efficiently to excitation by 3850 Angstrom radiation emitted by P-16 phosphor of CRT 522. This radiation is projected on screen 510 as a raster scan beam 560 via optics 532. Light pipes 542 serve as index strips and are shown much enlarged in FIG. 11. The sharp pulses of optical index signals emerging from the two ends of strips 542 are detected directly or they are combined to become index signal 2 via elements 548 and 550. These index pulses are used to control the sampling of the red and blue video signals as previously explained in Goodman U.S. Pat. No. 3,967,315 to develop side-by-side interspersed red and blue images. The size and position on target screen 510 of these two images is controlled as set forth with respect to FIGS. 1–6 in the foregoing part of this specification and also as will be explained below with reference to FIG. 7. Index strips 548 and 550 are made of plastic scintillator materials such as NE-108 which are "pumped" by the blue-white index signal emanating from the ends of index strips 542.

The size and position of the green image is registered on the target screen via index signal 1. For this purpose, index strips 544, 546, and 552 are provided which are made of NE-108 and are responsive to the green scanning beam depicted at 562 in FIG. 11. These strips are made responsive solely to the green scanning beam by providing green-pass optical filters as depicted at 543 to attenuate the ultraviolet scanning beam. Index strips 542 respond to ultraviolet but do not respond to green excitation and so no interference results from the green scanning beam. However, index strips 548 and 550 do respond to green excitation and therefor ultraviolet-pass optical filters 545 are used to block the green scanning beam. Alternatively, logic circuits can be used as disclosed in FIGS. 14–19.

The result is that index signal 1 controls the size and position of the green image on the target screen, and index signal 2 controls the size and position of the red/blue image. Means for achieving this control symbolized at 519 and 525 of FIG. 8 have been set forth previously with respect to FIGS. 1–6. The end desired result is that of continuous and automatic registration of the green image with the hybrid red/blue image.

DESCRIPTION OF FIRST ALTERNATE EMBODIMENTS

Figure 7:
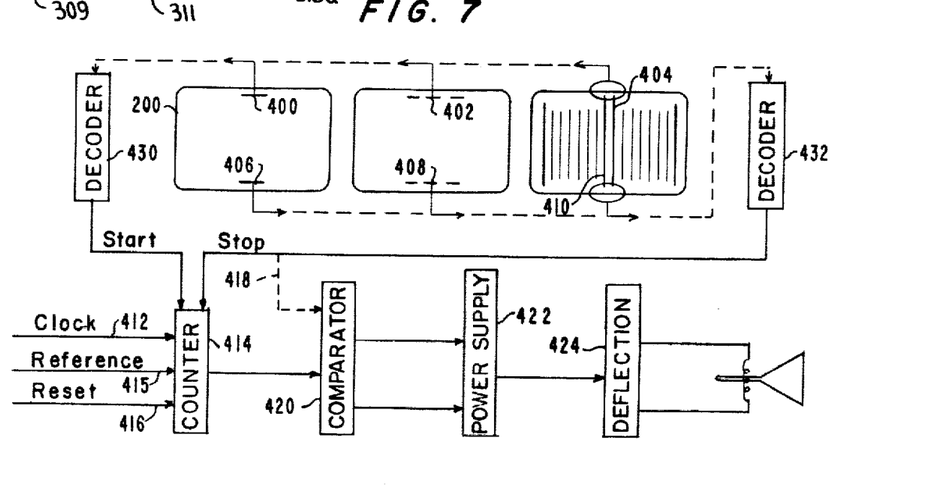
FIG. 7 is a block diagram which illustrates how the height of the picture is changed by controlling the duration of the vertical raster scan as measured from the top index signals to the bottom index signals.

In FIG. 5, vertical size control was achieved by having power supply 224 vary its output voltage in consonance with power supply 216. If the width of the picture was increased so was its height. In FIG. 7 independent control of the height of the picture is provided.

Index strips such as 400, 402, and 404 are positioned at the top of the target screen 200. Index strips such as 406, 408, and 410 are positioned at the bottom of the screen. Clock signals 412 are fed into counter 414. A reference count is inserted at 415, reset is at 416, and the compare instruction at 418 enables comparater 420. If the count is high, then too much time has elapsed in the vertical scan and power supply 422 is programmed to increase its output voltage. This expands the vertical size of the picture by increasing the drive of deflection means 424. It is thus seen that the operation of FIG. 7 is analagous to the operation of the horizontal width control of the picture as per FIG. 5. Reset 416 is via the vertical flyback pulse whereas in FIG. 5 reset at 215 is via the horizontal flyback pulse.

The top-index means 400, 402, 404 provide the start signals for counter 414 and bottom-index means 406, 408, 410 provide the stop signals. The conventional scanning action of the electron beam is substantially parallel to strips 400 and 402 whereas it is substantially perpendicular to strips 404, akin to the scanning action of strips 204 and 206 in FIGS. 5 and 6. Accordingly, decoding means 430 and 432 are provided to furnish the start and stop signals that operate counter 414. The simplest decoder arrangement comprises circuitry responsive to the long duration of the index signals that are obtained from 400, 402, and 406, 408. A decoder with a low pass filter will separate the fast pulses (emitted by index strips such as 204 and 206) from the long pulses (emitted by index strips 400 and 402). The index signals from strips 404 and 410 can be decoded by the absence of preceding and succeeding pulses. A like scheme of missing pulse decoding logic can be used for the last strip 206 of FIGS. 5 and 6. Alternatively, index strip 207 can be added to the target screen. Decoding can also be accomplished by using individual electron beam-sensitive optical fibers in accordance with applicant's prior teachings in U.S. Pat. No. 3,826,867.

Returning to FIG. 1, variable gain element 62 is shown between blue video signals (or B-Y) at input 26 and the luminance signal at input 42. Element 62 is operative when a low-intensity saturated blue field is being received for display. Under these conditions the luminance signal is small. A portion of the blue video therefore is added to the luminance signal to assist in the generation and detection of the index signals. One way for achieving these results is to connect diode 64 and resistor 66 as shown in FIG. 1.

Figure 4:
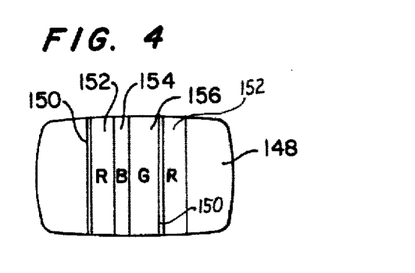
FIG. 4 is a greatly expanded view of one triad of a strip-like target screen in which the blue-emitting strip is the most narrow and the green-emitting strip is the most wide of the color-emitting strips.

Another feature that improves the image to be viewed is depicted in FIG. 4. Index signal generating strip 150 is followed by red-emitting strip 152, blue-emitting strip 154, and green-emitting strip 156 on target screen 148, akin to 200 of FIG. 5. Recommended horizontal dimensions for a 5 inch diagnonal display are 8 mils, 7 mils, 9 mils for the red, blue, and green-emitting strips, respectively. The recommended width of the index strips 150 is 2 mils. These index strips preferably are interspersed between the green strips 156 and the red strips 152, or they can overlap the adjacent edges of 156 and 152. By making the width of the blue strip the most narrow, the line structure of the target screen is made to appear less pronounced. As a consequence of either of these configurations the pitch of a triad is approximately 24 mils, and the resulting screen efficiency is over 90%.

Attention is drawn to Jesty U.S. Pat. No. 2,802,964 where narrow blue strips are recommended based upon his understanding of colorimetry principles. Jesty calls for strips which have a green/blue width ratio 6:1 and 3:1 in an R,G,B display; 6:1 in a four color display; and 8:1 in a twelve dot display. In contrast, it is here recommended that the blue line be reduced in width by a much smaller amount relative to the other colors in order to decrease the dark line effect it appears to exhibit in a line screen display. In this disclosure the ratio of green to blue line widths is 9 mils to 7 mils or (approximately 1.3:1) Another way to suppress the line structure is to limit the blue line width to approximately 7 mils as this approaches the resolving limit of the unaided human eye.

Two other configurations of the index strips on the target screen are possible which make the screen even more efficient. First, the index strip 150 need not be continuous in the vertical direction. The strip can be made of 2 mil squares separated by 1 mil spaces for example. Secondly, the index strip 150 need not be repeated once for every sequence of red, blue, and green-emitting strips. Thus, index strip 150 can be repeated for every six color-emitting strips. In the extreme, only 2 index strips need be used; one at the left margin and one at the right margin as depicted in FIGS. 5 and 6. This configruation requires a horizontal sweep with linear, or constant, characteristics such as can be provided by the width control features previously disclosed in this specification.

In the beam-index configurations just described the losses at the target screen are less than 10% of the available electron beam energy, and by using only 2 index strips the loss approaches zero. In marked contrast, it is to be noted that the equivalent target screen losses of the conventional shadow-mask color CRT is in the neighborhood of 70%.

DESCRIPTION OF OTHER EMBODIMENTS

With respect to FIG. 8, either or both of kinescopes 522 and 528 can be replaced by other types of scanning beams, including lasers and light valves. Viewing of target screen 508 can be from either side. And the green image can also be developed by ultraviolet excitation as for example by using 2537 Angstroms for scanning screen surface 510 which has been modified to include a uniform dispersion of a phosphor which responds to 2537 with green emission but which is not responsive to any great extent when energized by 3850 radiation from the P-16 phosphor of CRT 528. One example of such a phosphor is U.S. Radium P-1, GS-115. In this arrangement the red-emitting phosphor of screen 510 should respond only to the 3850 radiation and not the 2537. An example of such a phosphor is $Mg_2TiO_4$:Mn or $CdWO_4$:U. Also, cascade screens with different layers and optical filters can be used.

Figure 20:
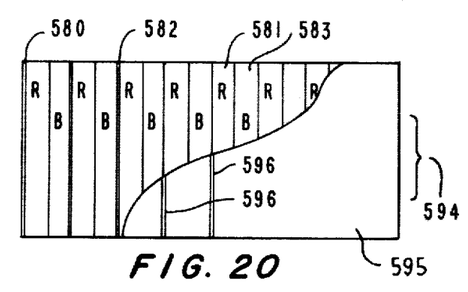
FIG. 20 illustrates a target screen for a CRT which combines the structure of the beam penetration CRT with the structure of the beam-index CRT.
Figure 21:
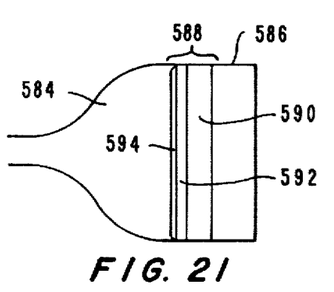
FIG. 21 is a side view of the target screen of FIG. 20.

In the application of the teachings of this disclosure to the situation wherein only a single kinescope is to be used, and wherein the alternation of color fields is not objectionable, then the penetration and beam-index principles can be combined as outlined in FIGS. 20 and 21. FIG. 21 shows a portion of kinescope 584 with a greatly enlarged view of its faceplate 586 and target screen 588. Green emitting layer 590 is homogeneous and adheres to faceplate 586, and barrier layer 592 is transparent to light but is opaque to low velocity electrons, thus forming one conventional structure of a penetration type target screen. The structure of layer 594 is shown in FIG. 20. Red-emitting strips 581 and blue-emitting phosphor strips 583 are interspersed with index strips such as 580 and 582 and are deposited in a thin layer to absorb a high proportion of the low velocity electrons. Electron transparent aluminum layer 595 completes the target screen. Note however that the index strips may also be positioned on the electron gun side of the aluminum layer as depicted at 596. In this arrangement it is contemplated that one field of excitation will generate a high resolution green image with high velocity electrons in a stroke writing mode, to be followed by a second field of excitation to generate a red and blue image with low velocity electrons in a raster scan mode.

Other embodiments are possible. Thus, the high resolution image can be generated in raster format with a larger number of scanning lines than the color image. Also, where alternation of fields is objectionable a second electron gun can be incorporated into the CRT of FIG. 21. The two guns then would operate at different voltages with each gun having its own deflection components and control circuitry.

Figure 15:
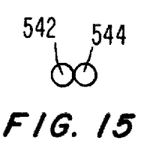
FIG. 15 is a cross-section of the index strips of FIG. 14.
Figure 16:
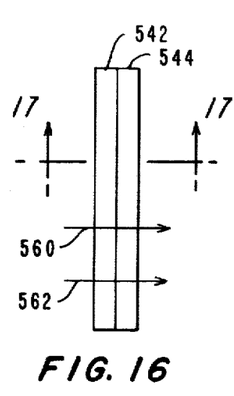
FIG. 16 illustrates another physical configuration of a pair of index strips.
Figure 17:
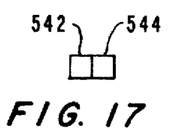
FIG. 17 is a cross-section of the index strips of FIG. 16.
Figure 17A:
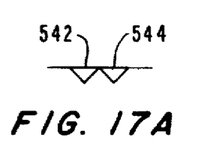
FIG. 17a depicts index strips with a triangular cross-section.

In FIGS. 14-17 index strips are shown which respond to excitation by the radiation contained in the optical images projected upon screen 508 in FIGS. 8-13. Light pipe 542 responds to the ultraviolet excitation of scanning beam 560. It does not respond to the green scanning beam 562. A material for this purpose is NE-102. Light pipe 544 responds to both the ultraviolet heam 560 and the green beam 562. Suitable material is NE-108. Circular, square, and triangular cross-sections that can be used for the light pipes are shown at FIGS. 15, 17 and 17a, respectively.

Figure 18:
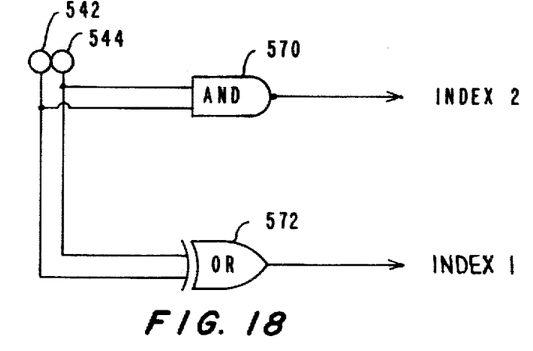
FIG. 18 depicts logic, or decoding, circuitry for separating the two index signals of FIG. 14.

The logic circuitry of FIG. 18 separates the two different index signals. The ultraviolet beam will excite both index strips, and therefore index signal 2 is readily derived from "AND" component 570. The green beam will only excite strip 544, and therefore index signal 1 is readily derived from "Exclusive-Or" component 572.

Figure 19A:
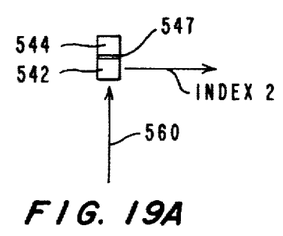
FIG. 19A illustrates two index strips which are self-decoding to provide an optical index signal.
Figure 19B:
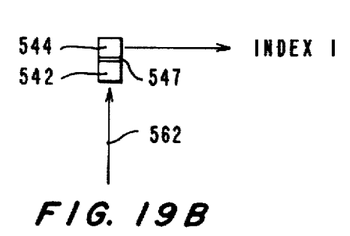
FIG. 19B illustrates the index strips of FIG. 19A which are self-decoding to provide another index signal.

Optical detection and filtering by the light pipes is shown in FIGS. 19A and 19B. Scanning beam 560 is in the ultraviolet. It excites strip 542 to produce index signal 2. In the process, it will be absorbed by strip 542 and therefore will not directly energize strip 544. Scanning beam 562 is green. It will not excite strip 542. It will be transmitted through strip 542 thus to excite strip 544 thereby to produce index signal 1. Green filter 547 is optional and will improve the separation of index signal 1 from index signal 2.

WARP OF SPACE, TIME, AND COLOR MATRICES

Returning to FIGS. 5 and 6, the operation of counters (CTR) 211, 311 and random-access memory (RAM) 309 and read-only memory (ROM) 209 is best described by starting with several elementary and simplifying assumptions, namely; the display screen is flat, the image area is rectangular, and the phosphor stripes and index stripes are all vertical and parallel; the scanning of the display screen by the beam of energy is conventional raster scan with proper linearity, which generates pictures by a scanning action which is substantially perpendicular to the phosphor and index stripes, thereby to lay down an image within the rectangular image area of the display screen; and the registration of the image on the screen is correct which in turn means that the deflection and/or projection components are all aligned properly.

Under the foregoing conditions, it is further assumed that for esthetic reasons the corners of the screen are to be concealed with a curved mask outlined at 205. Notwithstanding pertubations in the electron-optics, projection optics, or circuitry the system is automatically stabilized as hereinbefore explained. The only deficiency is that the information contained in the corners of the display is hidden from view by the mask.

In those cases where this deficiency is to be overcome, where the full image is to be seen, it becomes necessary to distort the phosphor stripes so that they fit in the viewable area defined by the mask. This slight reshaping of the phosphor stripes is taught for shadow-mask CRTs where the curvature of the faceplate and position of the frame make this distortion desirable. It is next assumed therefore that the phosphor stripes are made to conform exactly to the curved outline of the mask depicted at 205. It is assumed further that all the prior conditions of perfect alignment and sweep remain unchanged. Under these conditions, the counter (CTR) 311 and random access memory (RAM) 309 in FIG. 6 are used to control the shape of the left-hand margin of the raster, to increase the margin as shown at 205. Counter 311 is responsive to sync pulses 215a and in conventional manner counts the 525 scan lines of an NTSC raster. Typically, the sync input is serial and the outputs of CTR 311 and RAM 309 are in parallel. The output of RAM 309 is used to provide the reference count 308 for comparator 306 the RAM is programmable to make this reference count variable as a function of scan line number. Thus, at the top and beginning of the raster the output from 311 will correspond to a low line count. RAM 309 will receive this count. As the raster scan progresses from top to bottom, where different rows of the screen correspond to different scan line numbers, the output of counter 311 will vary accordingly. The RAM 309 is programmed to provide the shape desired for the left-hand margin. For example, at a mid-screen count in the vertical direction (262 for 525 non-interlaced lines; or 131 and 393 for an interlaced scan) the RAM is programmed to provide a reference count of 50. At a 20 mHz clock rate, this corresponds to a delay from the start input 304 of 2.5 microseconds, or approximately 5% of the horizontal scan time. At a top-screen count, where the left-hand margin 205 is to be increased to conform to shape 205, RAM 309 is programmed to provide a larger reference count, 100 for example. This corresponds to a 5 microsecond delay. Power supply 310 will show no change in output because the additional delay, from 215 to 5 microseconds, corresponds exactly to the additional time it takes the scanning beam to strike the curved margin 205 as compared to the straight margin 204. In this arrangement, if information was received during the interval from 2.5 to 5.0 microseconds it would be hidden from view by the mask.

There are three ways to recover this lost information. First, a matching delay of 2.5 microseconds could be inserted in the stream of video data to be displayed. Second, the horizontal sweep speed could be increased in order to increase the margin in the original 2.5 μsec time slot. Third, the start of the margin timing sequence could be shifted to match curve 205 as will automatically occur when the original reference count 308 remains unchanged. For ordinary viewing, as for entertainment purposes, the third alternative mentioned is the preferred embodiment. The margin in that case would shift to follow the first index stripe to an accuracy of approximately 1 count in 100. For projection systems this operation would also compensate for keystoning and other irregularities. Consequently, RAM 309 can be programmed to give a constant margin per the third alternative, or to give margins of any shape.

In all three of the above cases, further consideration is required for the end of the sweep line which now requires correction. Using the above third alternative as an example, it follows that the left margin has moved to the right. For symmetry, the right margin should be increased (moved to the left) as shown at 205a. Under the assumption that the sweep speed also remains constant, pictorial information is now lost at the end of the sweep. To recapture this information, the sweep speed has to be slowed down to enable a full line of video to fit into the scan time between 205 and 205a. This happens automatically. With the beam scanning at its original speed, the distance from 205 to 205a will be traversed in a shorter time than between 204 and 206.

Hence, counter 208 will input a lower count to comparator 214. As a consequence, the output of 214 will cause programmable power supply 216 to slow down the sweep as earlier described in this specification. The net result is the generation of a complete image which fits into the unmasked area of the display screen. To squeeze a rectangular image into the non-rectangular display area requires that the image be distorted. If the distortion is large, and especially if it changes rapidly, the image will not be recognizable. In FIG. 5, power supply 224 is also affected, and the modification of the vertical sweep may or may not be acceptable. If not acceptable, the arrangement of FIG. 7 is used to permit independent control of horizontal and vertical variables.

ROM 209 and counter 211 in FIG. 5 serve a similar purpose to RAM 309 and counter 311 in FIG. 6. By altering the reference count 212 fed into comparator 214 it becomes possible to distort different interval horizontal parts of the image, i.e., between left and right margins. Similar provisions can be made for the vertical deflection circuitry of FIG. 7; and the vertical and horizontal internal distortions and external margins can be programmed in unision for specific purposes. For example, the above disclosure can be used to provide digital control of variable gain ("zoom") features which can magnify (or shrink) any portion of the image.

More sophisticated applications of the above teachings are envisaged which can be used to code and decode rapidly changing matrices of information in shape, time, and color with a degree of control and precision not previously achievable.

Many different and conventional circuit designs exist and many components are commercially available for providing the above described circuit functions. Oscillators or clocks, counters, random access memories, read only memories, comparators, exclusive-or gates, missing pulse detectors, decoders, integrators, video amplifiers, and programmable power supplies are all available in either discrete component form, in integrated circuits, or in hybrid form. The disclosures in U.S. Pat. Nos. 3,564,121 and 3,826,867 and 3,967,315 provide details on index signal generation and detection, and on target screen construction. The disclosures in these patents are incorporated herein by reference. Accordingly, further circuit and construction details are deemed not necessary for a proper understanding of this invention and have not been included in the drawing nor in the foregoing specification.

Having thus described my invention, I claim:

1. In a display apparatus having first means for generating a first image and second means for generating a second image, including means for projecting and superposing said first image and said second image upon a distal viewing screen, the improvement comprising: third means to automatically sense the position of said first image on said screen; fourth means to automatically sense the position of said second image on said screen; and fifth means, responsive to said third and fourth means for automatically adjusting the position of said first image relative to said second image.

2. In a display apparatus having first means for generating a first image and second means for generating a second image, including means for projecting and superposing said first image and said second image upon a distal viewing screen, the improvement comprising: third means to automatically sense the position of said first image on said screen; and fourth means, responsive to said third means, for automatically adjusting the relative position on said screen between said first and second images.

3. A multi-color display system having a viewable screen comprising first means for producing a first image in a first color, second means for producing a second image in a second color, first index means for providing first index signals indicative of the position on the screen of said first image, second index means for providing second index signals indicative of the position of the screen of said second image, in combination with means responsive to said first and second index signals for automatically and periodically adjusting the superposition of said first and second images.

4. An apparatus in accordance with claim 3 wherein said first means comprises means for producing a high definition image which comprises radiation in the green portion of the visible spectrum, and wherein said second means comprises a repeating array of red and blue color-producing strips for producing said second image.

5. An apparatus in accordance with claim 4 including means for producing said first image (green) in a stroke-writing mode and means for producing said second image (red/blue) in a raster-writing mode.

6. An apparatus in accordance with claim 4 wherein the repeating array of red and blue color-producing strips is characterized by the feature that the blue lines are more narrow than the red lines.

7. An apparatus in accordance with claim 1 wherein said first means for generating said first image comprises means for generating said first image with radiation in the green portion of the spectrum; and wherein said second means for generating said second image comprises means for generating an image in the ultraviolet portion of the spectrum.

8. An apparatus in accordance with claim 7 wherein the distal viewing screen comprises ultraviolet responsive material for converting said second image into a visible image.

9. An apparatus in accordance with claim 7 including means for generating the second image, in the ultraviolet portion of the spectrum, so that it is representative of both the red and blue information to be displayed.

10. An apparatus in accordance with claim 9 wherein the distal viewing screen comprises a repeating array of red and blue color-producing strips which generate their respective colors when excited by radiation in said ultraviolet portion of the spectrum.

11. An apparatus in accordance with claim 1 wherein said third means for sensing the position of said first image on the viewing screen comprises first index strips responsive to radiation in said first image, wherein said fourth means for sensing the position of said second image in the viewing screen comprises second index strips responsive to radiation in said second image, and decoding means for separating the signals emanating from said first and second index strips.

12. A multi-color display system comprising: first means for generating a first viewable image representative of first information-bearing signals to be displayed; second means for generating a second optical image representative of second information-bearing signals to be displayed; a display screen; means for superposing said first viewable image and said second optical image on said display screen; wherein said display screen comprises converting means for changing said second optical image into a visible image which lies in a region of the spectrum different from that of said first image.

13. The system of claim 12 wherein said second means generates said second optical image in the ultraviolet region of the spectrum.

14. The system of claim 12 wherein said second means generates said first viewable image in the green region of the visible spectrum.

15. The system of claim 12 wherein said first means generates said first image primarily in the green part of the spectrum and wherein the converting means in said display screen produces its visible image primarily in the red part of the spectrum.

16. A multi-color display system comprising: means for receiving input signals representative of green, red, and blue information to be displayed; first means for generating a first visible image representative of the green information; second means for generating a second optical image representative of both the red and blue information; a display screen; means for superposing said first visible image and said second optical image on said display screen; and wherein said display screen comprises converting means for changing said second optical image into red and blue images corresponding to said red and blue input signals.

17. The system of claim 16 wherein said second means generates said second optical image in the ultraviolet region of the spectrum, and wherein said converting means in the display screen comprises a repeating array of red-emitting and blue-emitting fluorescent strips which are responsive to excitation by the ultraviolet image.

18. A rear-projection display system in accordance with claim 17 wherein said red-emitting and blue-emitting strips are characterized by the features that they are adjacently positioned in a planar configuration, disposed so as to be excited by the ultraviolet image on one side of the planar configuration, thin enough so that the thus-produced red and blue radiation is transmitted therethrough for viewing on the other side, and sufficiently uniform in optical properties so as not to interfere with the first visible image.

19. In a display system adapted to superpose a first image and a second image upon a common viewing screen, the improvement comprising: sensing means in said viewing screen for indicating the position on said screen of each of said first and second images, and means responsive to said sensing means for automatically adjusting the position of at least one of said images.

20. A display system in accordance with claim 19 including stroke-writing means for generating said first image with relatively high resolution, and raster-scan means for generating said second image with relatively lower resolution.

21. A display system in accordance with claim 19 including first raster-scan means for generating said first image and second raster-scan means for generating said second image, and wherein one image is formed by a large number of scanning lines and the other image is formed by a relatively small number of scanning lines.

22. A high-resolution full-color display system comprising first means for generating a relatively high-resolution image; second means for generating a pattern of optical radiation representative of two different visible colors intended to be added to said high-resolution image; a display screen for combining said high-resolution image and said pattern of optical radiation, said display screen having converter means for changing said optical radiation into the two different visible colors to be added to said image; beam-index means in said display screen; and means responsive to said beam-index means for adjusting the registration of said two different colors with respect to the high-resolution image.

23. The system of claim 22 wherein said display screen comprises a planer-like configuration of a repeating array of red-emitting and blue-emitting strips responsive to said optical radiation.

24. The system of claim 23 wherein said beam-index means comprises first index strips for generating first optical index signals indicative of the position on said screen of said pattern of optical radiation; means responsive to said first optical index signals for controlling the position on said screen of the red and blue strip-like images generated via said optical radiation; wherein said beam-index means also comprises second index strips for generating second optical index signals indicative of the position on said screen of said high-resolution image; and means responsive to said second optical index signals for controlling the position on said screen of the high-resolution image.

25. The system of claim 24 wherein the first index strips are comprised of optical light pipes responsive solely to excitation by said optical radiation.

26. The system of claim 24 wherein the second index strips are comprised of optical light pipes responsive to excitation by the radiation in said high-resolution image.

27. The system of claim 24 in combination with "exclusive-or" means for separating said first and second optical index signals.

28. In a display system comprising means for generating a first raster-scan image and means for generating a second raster-scan image, a display screen, means for projecting said first and second images upon said display screen, and means for superposing said first and second images; the improvement comprising: control means for automatically and periodically adjusting the superposition of said first and second images, said control means comprising first beam-index signal generating means in said display screen responsive to the radiation in said first image and second beam-index signal generating means in said display screen responsive to the radiation in said second image; and means in said control means, responsive to the time taken to scan particular lines, for adjusting the superposition of the two images.

29. The method of achieving registration between two images displayed on a common screen comprising the steps of:
1. generating a first scannable beam of energy adapted to generate a first image,
2. scanning said beam across a target screen to form at least one scan line,
3. measuring the time it takes said beam to scan a predetermined section of said scan line,
4. comparing the thus-measured time to a reference,
5. and adjusting the rate of scan of said beam as a consequence of said comparison, thereby to achieve a predesignated scanning rate,
6. generating a second scannable beam of energy adapted to generate a second image,
7. scanning said second beam across the same target screen to form at least one other scan line,
8. measuring the time it takes said second beam to scan a predetermined section of said other scan line,
9. comparing said last-mentioned time to a reference, and
10. adjusting the rate of scan of said second beam, independent of the rate of scan of the scannable beam of energy, as a consequence of said last-mentioned comparison thereby to achieve a predesignated scanning rate for the second beam,
11. whereby registration is effected between the first and second images.

30. The method of claim 29 including the steps of:
12. generating first start and stop index pulses for measuring the time A it takes the first beam to scan said predetermined section,
13. generating second start and stop index pulses for measuring the time B it takes the second beam to scan its predetermined section, and
14. distinguishing between the index pulses of steps 12 and 13 by "anding" the first and second index pulses to provide a measure of time A and by performing the "exclusive-or" logic on said first and second index pulses to provide a measure of time B.

* * * * *